US007444645B1

(12) United States Patent
St-Michel et al.

(10) Patent No.: US 7,444,645 B1
(45) Date of Patent: Oct. 28, 2008

(54) METHOD AND SYSTEM FOR DETECTING CONTENT ON MEDIA AND DEVICES AND LAUNCHING APPLICATIONS TO RUN THE CONTENT

(75) Inventors: Stephane St-Michel, Woodinville, WA (US); Chris J. Guzak, Kirkland, WA (US); Autumn F. G. Neault, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 09/731,215

(22) Filed: Dec. 6, 2000

Related U.S. Application Data (60) Provisional application No. 60/198,977, filed on Apr. 21, 2000.

(51) Int. Cl.
  *G06F 9/44* (2006.01)
  *G06F 3/00* (2006.01)
(52) U.S. Cl. ............................ 719/318; 710/12; 710/15
(58) Field of Classification Search ............... 710/8–22; 711/1–173; 717/168–178; 713/1; 715/700–866; 719/318
  See application file for complete search history.

(56) References Cited

U.S. PATENT DOCUMENTS

| 5,711,672 | A | * | 1/1998 | Redford et al. ......... 434/307 R |
| 5,748,980 | A | * | 5/1998 | Lipe et al. ...................... 710/8 |
| 5,793,366 | A | * | 8/1998 | Mano et al. .................. 715/839 |
| 5,835,759 | A | * | 11/1998 | Moore et al. .................... 713/1 |
| 5,887,193 | A | * | 3/1999 | Takahashi et al. ............. 710/8 |
| 5,954,805 | A | * | 9/1999 | Brusky et al. ................ 710/36 |
| 6,032,202 | A | * | 2/2000 | Lea et al. ........................ 710/8 |
| 6,117,186 | A | * | 9/2000 | Wydall et al. ............... 717/174 |
| 6,282,710 | B1 | * | 8/2001 | Boehler .......................... 717/3 |
| 6,311,242 | B1 | * | 10/2001 | Falkenburg et al. ......... 710/301 |
| 6,529,992 | B1 | * | 3/2003 | Thomas et al. .................. 711/1 |
| 6,591,314 | B1 | * | 7/2003 | Colbath ....................... 710/36 |
| 2002/0069353 | A1 | * | 6/2002 | Smith ............................. 713/1 |
| 2002/0078367 | A1 | * | 6/2002 | Lang et al. .................. 713/200 |

OTHER PUBLICATIONS

Thomas A. Roden and Glenn E. Jystad, "Plug and Play Run-Time Services," *Dr. Dobb's Journal*, Sep. 1995, pp. 62-66.
Tom R. Halfhill, "The New PC: Four new technologies will usher your next PC into the '90s," *Byte*, Oct. 1995, pp. 52-64.
Barbara L. Maia Goldstein, "Plug and Play Software for Agile Manufacturing," *SPIE*, Proceedings, vol. 2913, Nov. 18-19, 1996, pp. 96-116.
Aaron Brown, et al., "IStore: Introspective Storage for Data-Intensive Network Services," *IEEE*, 1999, pp. 32-37.
E. Chang, et al., "A Large Scale Distributed Object Architecture—CORBA & COM for Real Time Systems," *IEEE*, 2000, pp. 338-341.
Patrick Gueulle, "Connector adds plug-and-play capability," *EDN*, Jul. 4, 1996, pp. 98-100.
Brian Markwater and Larry Stickler, "Design Techniques for Plug-and-Play in 'Smart Homes' and Consumer Products," *Electronic Design*, Aug. 18, 1997, pp. 64-68.

\* cited by examiner

*Primary Examiner*—Meng-Ai An
*Assistant Examiner*—Charles E Anya
(74) *Attorney, Agent, or Firm*—Shook, Hardy & Bacon LLP (57) ABSTRACT

A method and system are provided for detecting content on media and devices and automatically launching applications to run the detected content. In one embodiment, the system searches the media or device for content and automatically launches the appropriate application without the user searching for the application. In another embodiment, the system provides the user with a filtered list of applications to run content found on the media or device.

33 Claims, 9 Drawing Sheets

METHOD AND SYSTEM FOR DETECTING CONTENT ON MEDIA AND DEVICES AND LAUNCHING APPLICATIONS TO RUN THE CONTENT

CROSS-REFERENCE TO RELATED APPLICATIONS

This application claims the benefit of U.S. provisional application Ser. No. 60/198,977 filed Apr. 21, 2000.

TECHNICAL FIELD

The present invention relates generally to computer software and, more particularly, to a method and system for detecting content on media and devices and launching applications to run the content.

BACKGROUND OF THE INVENTION

Computer systems are becoming increasingly more complex and have the ability to recognize and process a variety of content types. As computer systems increase in size and capability, users are required to gain a broader understanding of such systems. Users may have difficulty navigating through multiple applications and content now available on computer systems. These systems have expanded to include a variety of computer readable media, including removable computer storage media containing a variety of data and data file formats. For example, types of media may include a variety of flash card formats including Compact Flash, Smart Media, and Memory Stick. Additionally, removable media may also include Compact Discs (CDs), digital video discs (DVD's), Zip Jaz drives, PC cards and external hot plug fixed drives. The types of content found on this media may include pictures, music files, video, music CD, DVD, and traditional computer software formats including word processing, database and spreadsheet formats.

Additionally, computer systems now have the ability to accept removable plug-in devices directly into the system architecture. Digital cameras, digital video recorders and scanners are examples of such plug and play devices. Plugging these devices into the system allows users to process information directly from the device's internal memory without having to utilize a removable memory device such as a memory stick or diskette.

Current systems typically initiate accessing media or devices in one of two ways. First, the user may access the device itself, search for the file and then select the file to run. An application will start up upon selection of that particular file and begin running or processing the files. Secondly, if the user knows the type of media or device inserted, the user may find the application and start the application. The user then searches for the particular file on the inserted media or device and selects the appropriate file that will be run by the opened application.

The above methods for accessing media and devices present various drawbacks. As mentioned above, when media or hardware devices with media content are plugged into a computer, the user typically has to select the device or search for the application on the system. If the user selects the device and opens a file, the incorrect or undesired application may inadvertently start-up. For example, the user may have initially recorded the file in one format that is associated with an application set-up by default to run a certain file format. The user may wish to edit this file using another application other than the application used to originally create the file. This results in the undesired start-up of a particular application. Thus, the user would have to select the new application before opening the file. Further, it may be difficult for users to find the desired file to open. For example, flash and CD media utilize a complex file subfolder structure to store data. Thus, users would be required to access multiple folders to find a particular file. This process is slow and requires many repetitive user steps.

Additionally, users may not know where an application resides in the system even though they know the application to select to run a certain type of content. With systems becoming larger and more complex, applications may be stored in a variety of locations on the system and it may be difficult for users to locate the executable file to run the application. This again requires the user to perform multiple steps to access a single file.

Another drawback with existing methods for accessing media and devices is that users may not know what application to select for a certain file type or device. In one case, a single file format may be accessed by multiple applications. For example, pictures in a JPG format may be opened by numerous picture viewing or editing applications. In another situation, multiple file formats, including video, music and word processing files, may be stored on mixed media storage devices such as a Zip drive. With mixed media storage devices, the user may select the incorrect application to run the particular file type. When this occurs, the user may have to initiate several applications before finding the correct application to run that particular content type. As a result, the user is performing multiple steps to properly run a certain type of file. Once again, this process is slow and requires numerous repetitive user operations.

Accordingly, there exists a need to allow a user to easily run multiple types of content media. Moreover, there is a need for such a method in system to initiate running of applications according to the content type residing on the media.

SUMMARY OF THE INVENTION

Generally described, a method in a computer system for detecting devices and media having content and launching applications to run the content is provided. In accordance with the method, data describing the media or device is obtained from the operating system and the content is detected. An application is assigned to launch the content and the application is launched.

In another aspect of the invention, another method in a computer system for detecting devices and media having content and launching applications to run the content is provided. According to the method, data describing the media or device is obtained from the operating system. An application is assigned to launch the content and the application is launched.

In a further aspect of the present invention, a method in a computer system is provided for registering devices having content in a system registry. In accordance with the method, data describing the device is obtained from the device. The system then places the data into the registry.

In still another aspect of the present invention, a computer system for detecting content on media or devices and launching related applications is provided. The system includes a shell service for assigning content to one or more applications and a handler for running the detected content on the one or more applications.

In yet another aspect of the present invention, in a computer system having a graphic user interface including a display and a user interface selection device, a method of obtaining content on media or devices and selecting related applications is provided. According to the method, content is detected on the media or device and a list of one or more applications associated with the content is retrieved. The list of the one or more applications is then displayed. The system receives a selection signal indicative of the user interface selection device choosing one of the one or more applications and in response to the selection signal, the system opens the content with the selected application. Alternatively, in response to the selection signal, the system assigns the content to the selected application.

In still another aspect of the present invention, a method of assigning content types to a default action is provided in a computer system having a graphic user interface including a display and a user interface selection device. According to the method, content types and one or more default actions associated with the content types are retrieved and displayed to the user. The system then receives a selection signal indicative of the user interface selection device choosing the content type and one of the one or more default actions. Finally, in response to the selection signal, the system associates the chosen content type with the chosen default action.

A method and system are provided for detecting content on media and devices and automatically launching applications to run the detected content. In one embodiment, the system searches the media or device for content and automatically launches the appropriate application without the user searching for the application. In another embodiment, the system provides the user with a filtered list of applications to run content found on the media or device.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
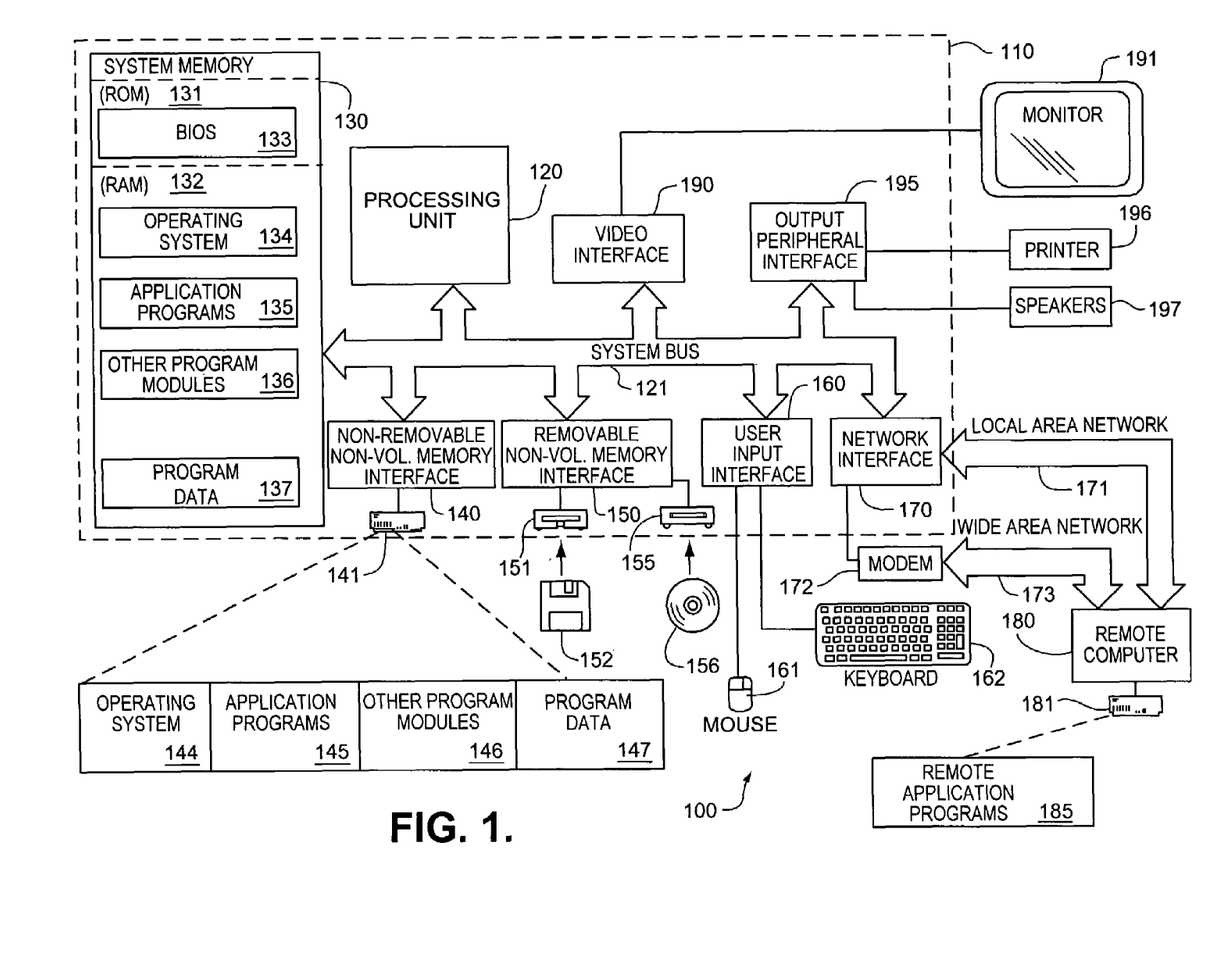
FIG. 1 is a block diagram of a computing system environment suitable for use in implementing the present invention.

The present invention provides a method and system for detecting content on hardware devices and launching an associated application to run the content. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

The method and system of the present invention determines the content on media or devices and provides the most closely associated applications registered for that content and media or device. Although the method and system are described as being implemented in a "WINDOWS" operating system by "MICROSOFT", one skilled in the art would recognize that the method and system can be implemented in any system supporting the automatic launching of applications for a particular content on a media or device.

As best seen in FIGS. 2A-2F, the present invention uses an Autoplay service that implements a method for detecting content on media or devices and launching applications to run the content. At step 200, a user inserts media into a removable memory device or attaches a device directly to the system. These are events that are monitored by the Autoplay system. As described above, removable media may include, but are not limited to, magnetic discs, optical discs, magnetic tape cassettes, flash memory cards, digital video discs (DVDs), digital videotapes, solid state RAM, solid state ROM, and the like. Alternatively, the user may attach hardware devices directly to the system. Removable hardware devices may include a scanner or digital camera that are connected directly to the system bus or to a removable device interface attached to the system bus.

When a new device is attached to the system, a conventional plug and play service detects the device and automatically installs it. During this process, the plug and play system, utilizing the plug and play ID for the device, finds the appropriate information file for the device and applies the settings contained in the device's INF file. This results in device information being placed into the computer system's registry. In addition to retrieving general device information, the present invention also retrieves information from the device's INF file to run the Autoplay feature. This information includes device handler data that provides the system with information that allows implementation of the Autoplay feature.

Alternatively, the Autoplay feature may use device handler data previously loaded into the registry when the registry was originally built or when it was updated in subsequent versions of the operating system. The device handler data may also be obtained utilizing proprietary "MICROSOFT" Operating System descriptors when implementing the Autoplay feature in a "MICROSOFT" Operating System environment.

For the Autoplay feature to associate particular content types with an associated handler application, independent software vendors register their handler applications on the system. If an application is not registered with the Autoplay feature, then it will not be offered as a selection for users when associating a particular content type with a handler application. Typically, software is registered to handle the Autoplay events during the installation of that particular handler application on the system. This information is typically associated with a particular registry key that establishes a link between the Autoplay feature, the content on the media or device and the independent software vendor's handler application.

The Autoplay feature is also extensible to allow for new types of media, devices and handler applications. Utilizing the existing registry, the Autoplay process described below uses registry information supplied by the independent hardware and software vendors to implement the method. Thus, the Autoplay process is not limited to existing content formats and devices.

Figure 2A:
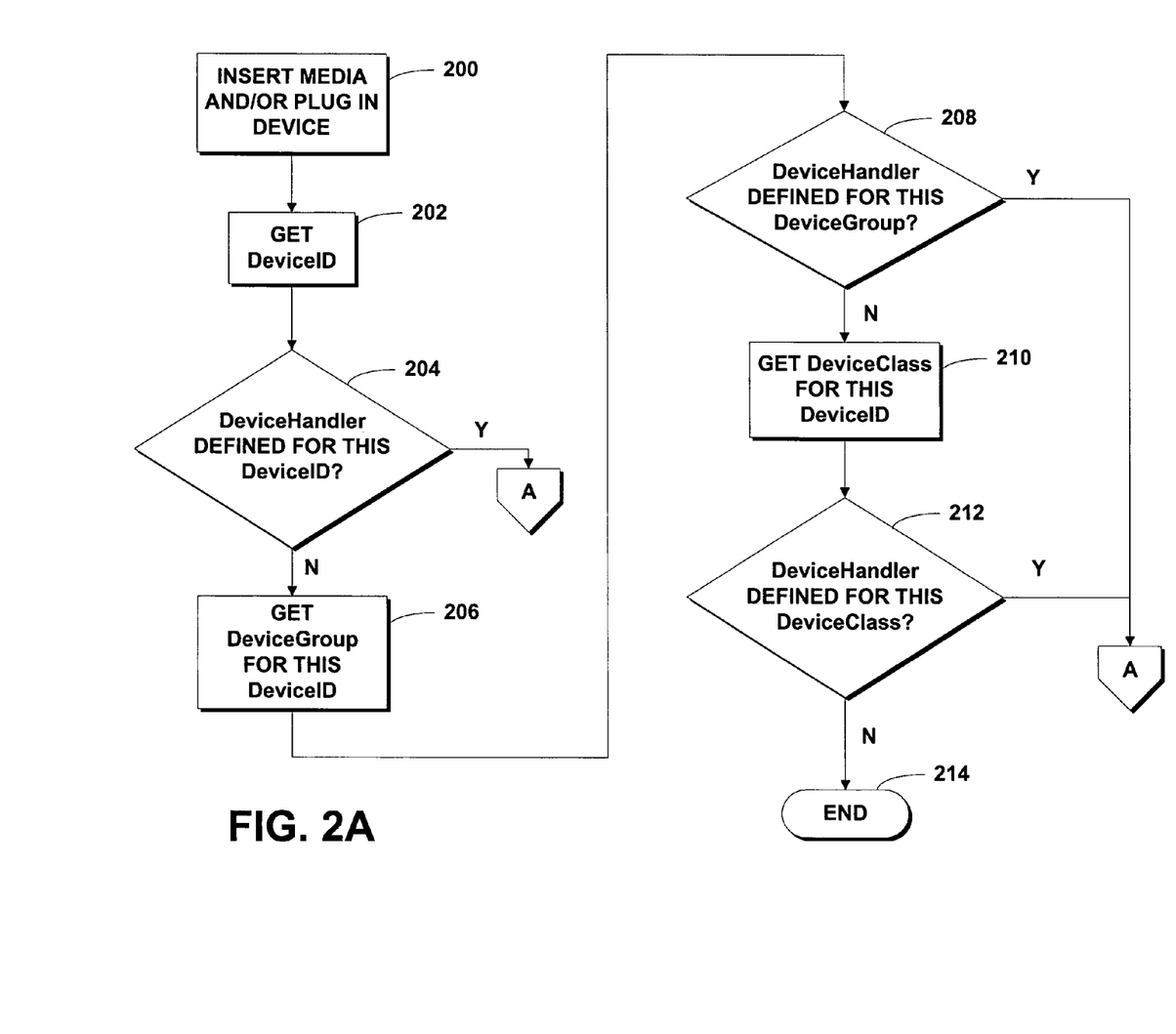
FIGS. 2A-2F are flow diagrams illustrating a preferred method for detecting content on media and devices and launching applications for running the content.
Figure 2B:
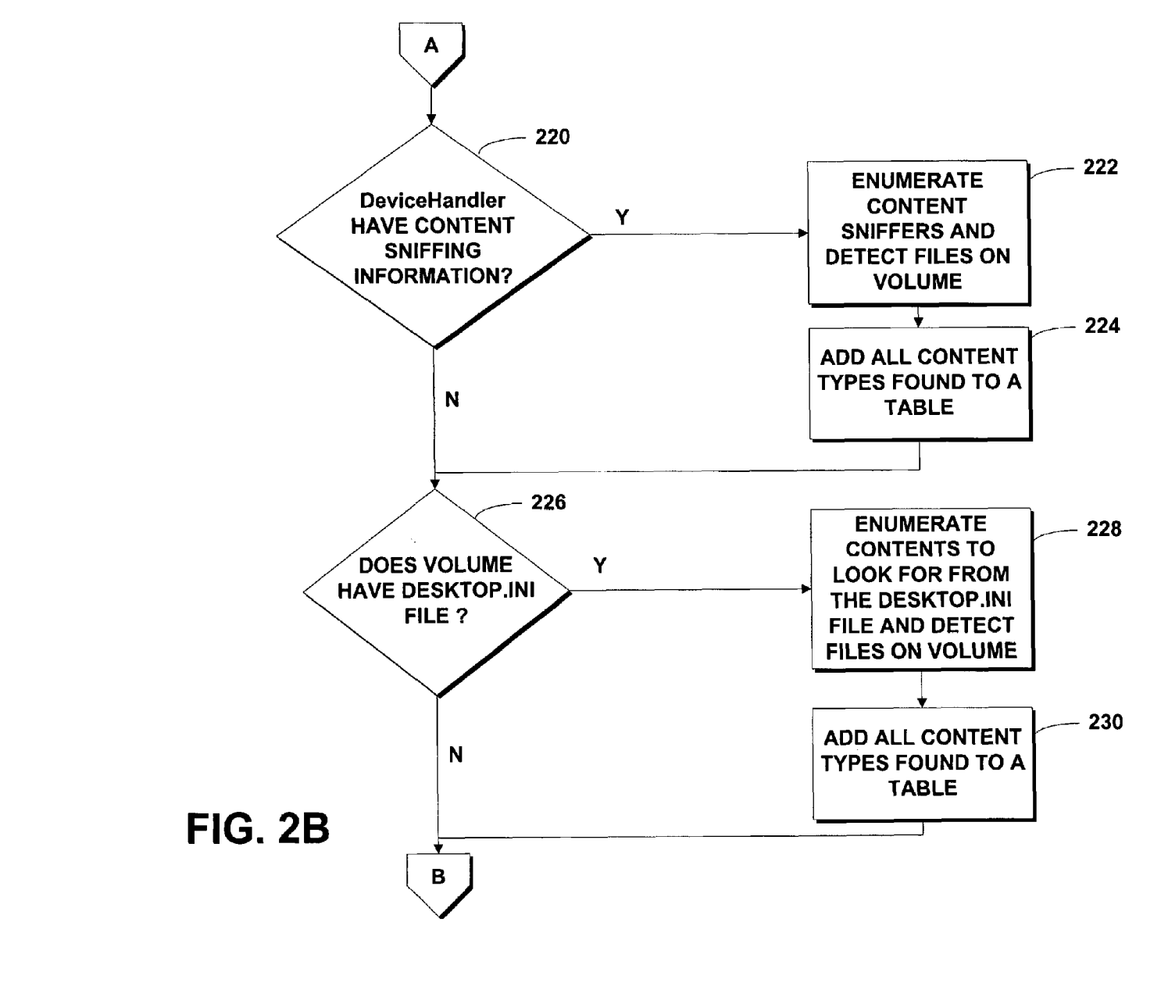

After the media is inserted or the device is plugged in, the system begins the Autoplay process by searching for and retrieving a DeviceHandler for the particular device or media at steps 202-212. At step 202, the system retrieves the DeviceID for the device that generated the event. The DeviceHandler key may be located in one of three areas—the device itself (DeviceID), the device group (DeviceGroup) or the device volume or class (DeviceClass). At step 204, the system determines if there is a DeviceHandler defined for this DeviceID in the registry. If the DeviceHandler is not defined for this DeviceID the system will search for and retrieve a DeviceGroup for this DeviceID at step 206. The system then determines if there is a DeviceHandler defined for this DeviceGroup in the registry at step 208. If the DeviceGroup is not found for this DeviceID, the system will search for and retrieve a DeviceClass at step 210. The system will then determine if there is a DeviceHandler defined for this DeviceClass at step 212. If a DeviceHandler was not found for any one of the above, then the Autoplay feature will not occur for events initiated by this device or media at step 214. If a DeviceHandler is found for the DeviceID at step 204, for the DeviceGroup at step 208, or for the DeviceClass at step 212, the system will begin the process of searching for content on the media or device as described in steps 220-230.

Once the DeviceHandler is found, the Autoplay system searches for a content type sniffer at step 220. Content type sniffers for specific devices are registered under "ContentTypes" located under the DeviceHandler for this particular device event. Content type sniffers identify content on media and devices when an event is triggered and links the content to a ContentTypeHandler. If a ContentTypes key is found, then the values residing under it as ContentTypeHandlers will be enumerated at step 222 from the registry and each of the associated files are detected on the volume. When detecting files on the volume, the system will query for one of the following values in the following order. First, "RelPattern" is a value associated with a string that represents a filename pattern to search for from a newly arrived device or media. For example, "HIFI\*.mp3". Using this value, the system will build a pathname consisting of the DeviceID to where it appends the RelPattern string. For example, a device residing in slot F would have the pathname F:\HIFI\*.mp3. Using this pathname, the system then computes the number of files matching this pattern. Second, the "ProgID" value represents the program ID of a COM object to be resolved to a class ID (CLSID). Third, the "CLSID" value represents the class ID of a COM object to be instantiated to sniff the content of the device or media. Once all the ContentTypes types are found, the ContentTypes types are added to a table at step 224.

Additionally, the system will search for a DESKTOP.INI file in the root of the volume of the device or media at step 226. The DESKTOP.INI file follows the syntax of a conventional "WINDOWS" IM file and contains a listing of the content placed on the media or device. If a DESKTOP.INI file is found, the contents within the file are enumerated and the files described in the INI file are detected on the volume at step 228. Once all the ContentTypes types are found, they are added to a table at step 230. If, at step 220, the DeviceHandler does not have content sniffing information, it immediately searches the volume for a DESKTOP.INI file at step 226.

Figure 2C:
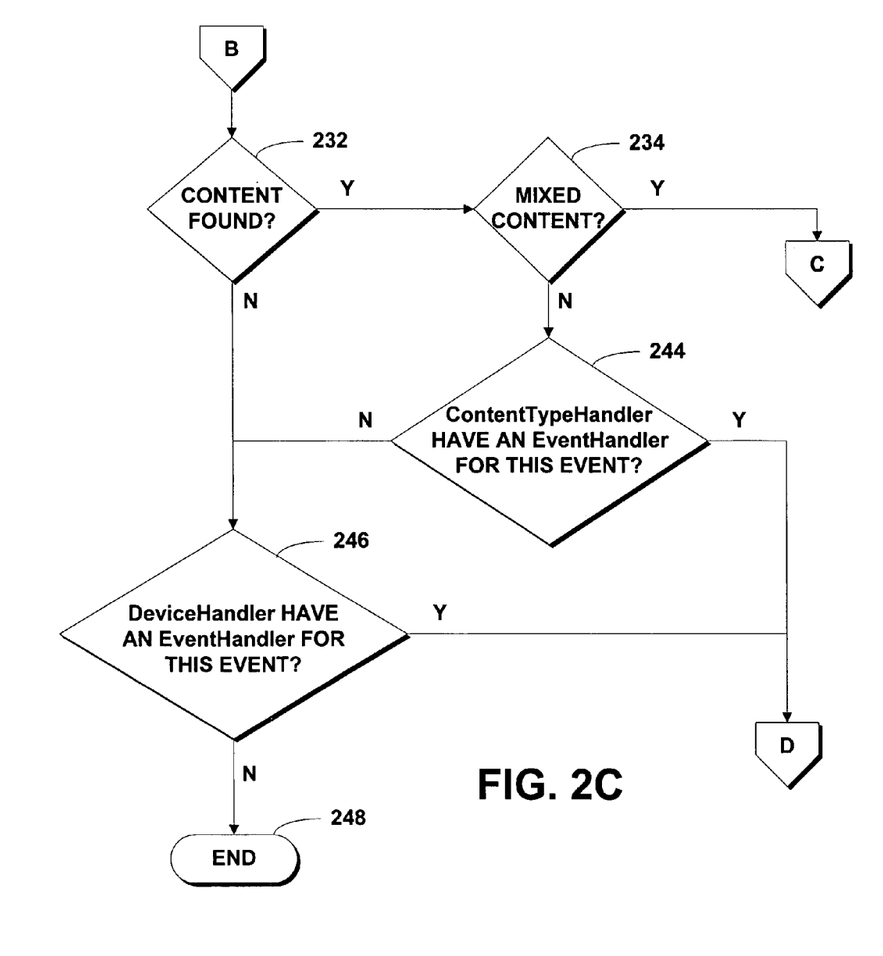
Figure 2D:
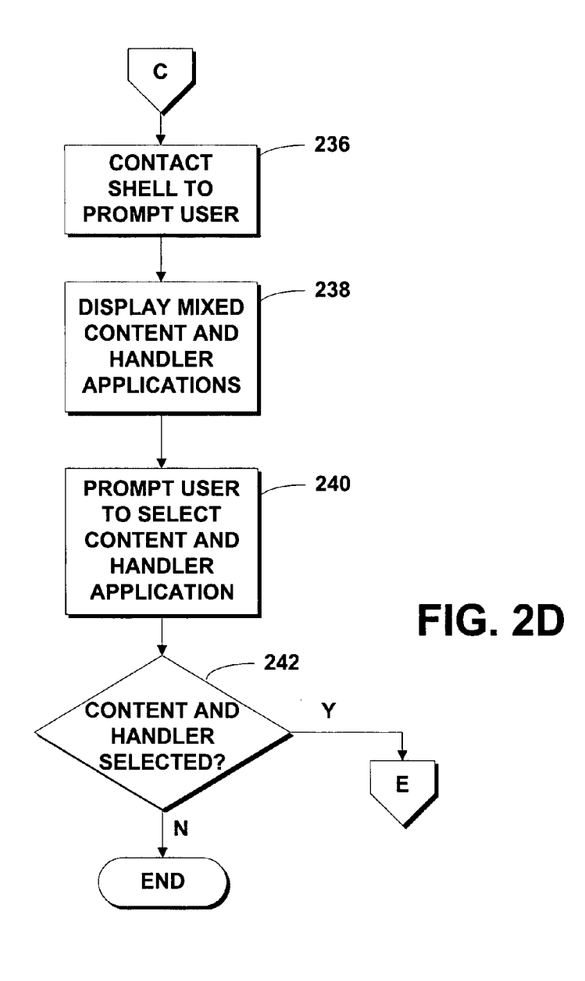
Figure 2E:
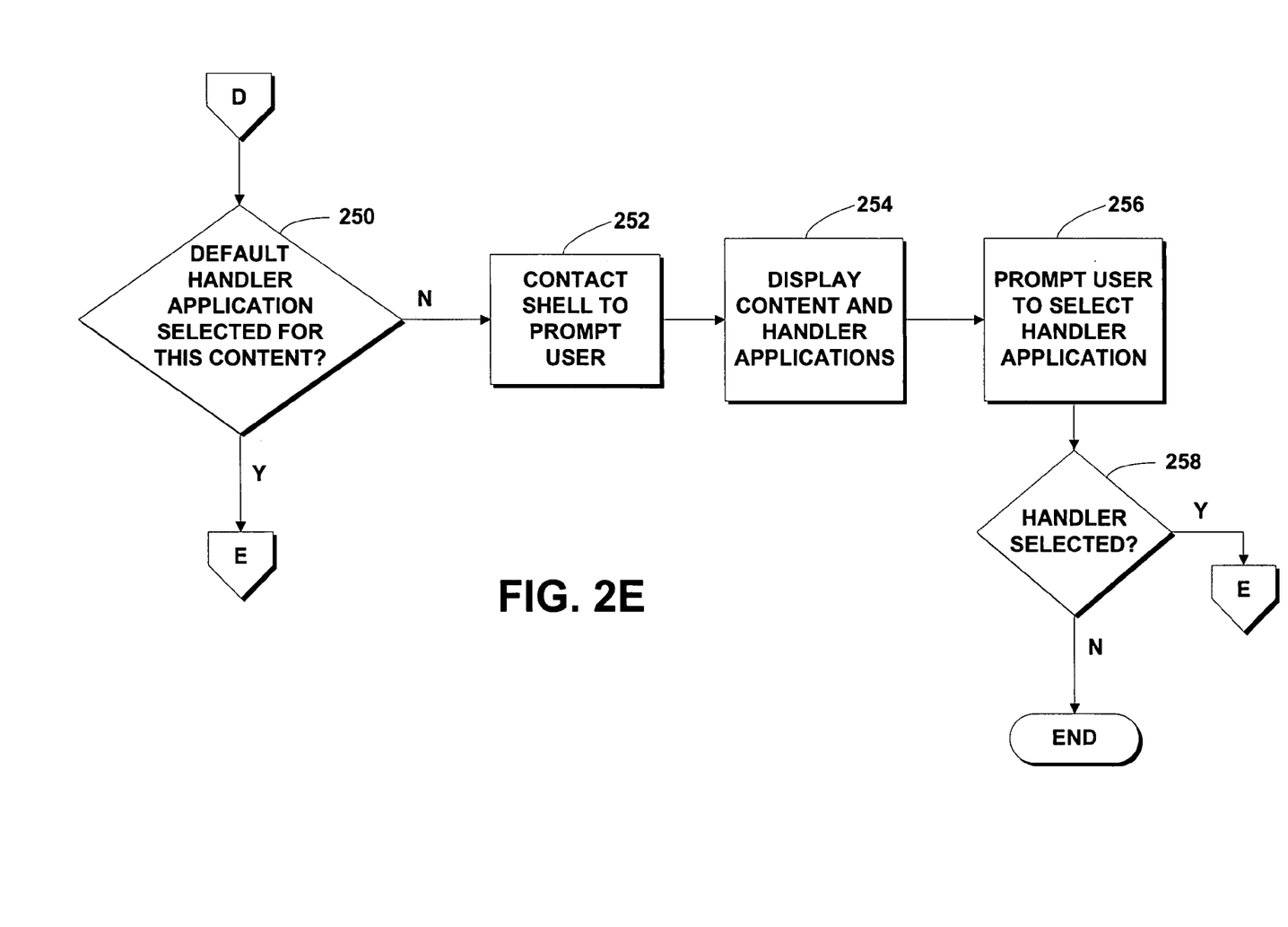

If the volume does not have a DESKTOP.INI file or after adding all ContentTypes types to a table, the system determines if content was found on the device or media at step 232. If content is found at step 232, the system determines if mixed content exists on the device or media at step 234. That is, the system will determine if there is more than one type of content on the media. For example, different content types include picture files in JPG format, music files in MP3 format or video files in MPG format. If more than one type of content is found on the media or device, the system contacts a shell for the current user to prompt the user for further information at step 236 (FIG. 2D). The shell then displays a dialogue screen displaying that mixed content was found on the media or device and provides a filtered list of handler applications that can run the mixed content found on the media at step 238. The user is prompted to select a handler application to run the desired content at step 240. If the user selected a handler, at step 242, the system proceeds with opening the particular content with the handler as will be discussed in greater detail below. If the user does not associate a content type with a handler application at step 242, the system does not run the Autoplay feature.

Figure 5:
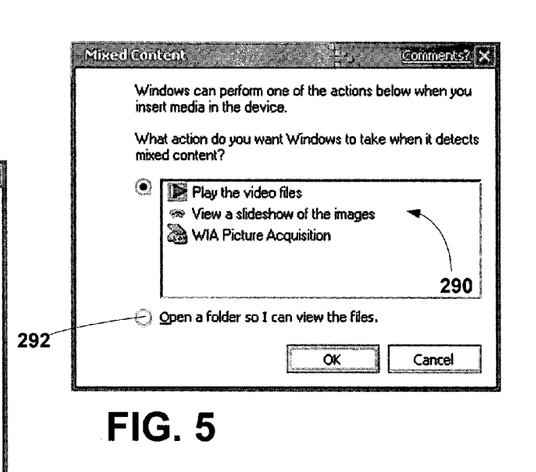
FIG. 5 is a view of a graphical user interface for selecting handler applications for a mixed content in accordance with a preferred embodiment of the present invention.

FIG. 5 is a view of a graphical user interface for selecting handler applications for a mixed content in accordance with a preferred embodiment of the present invention. The mixed content dialog box provides a list of filtered handler applications 290 for users to select when encountering a mixed media device. Additionally, users may select button 292 to view the content files on the media or device.

Referring back to FIG. 2C, if content is not found at step 232, the system determines if the DeviceHandler has an EventHandler associated with this event at step 246. At this point in the process, the system has not found a ContentTypeHandler for the device under the DeviceHandler key to process the event. Events that may not have associated ContentTypeHandlers are plugging devices into the system where the device does not allow the operating system to access the content because of proprietary storage and communication methods for the device. Examples of these devices include, but are not limited to, MP3 players. Thus, for the system to handle these events, the Autoplay feature may have an EventHandler associated with a particular device. If the device has registered an EventHandler under its DeviceHandler key in the registry, the Autoplay feature continues at step 250 as described below.

Referring back to FIG. 2C, if only one type of content is found at step 234, the system will determine if the ContentTypeHandler has an EventHandler for this event. If a ContentTypeHandler was not found, the system will determine if the DeviceHandler has an EventHandler for this event at step 246. If neither the ContentTypeHandler nor the DeviceHandler has an EventHandler for a particular event, the Autoplay feature is not run by the system at step 248.

Figure 4:
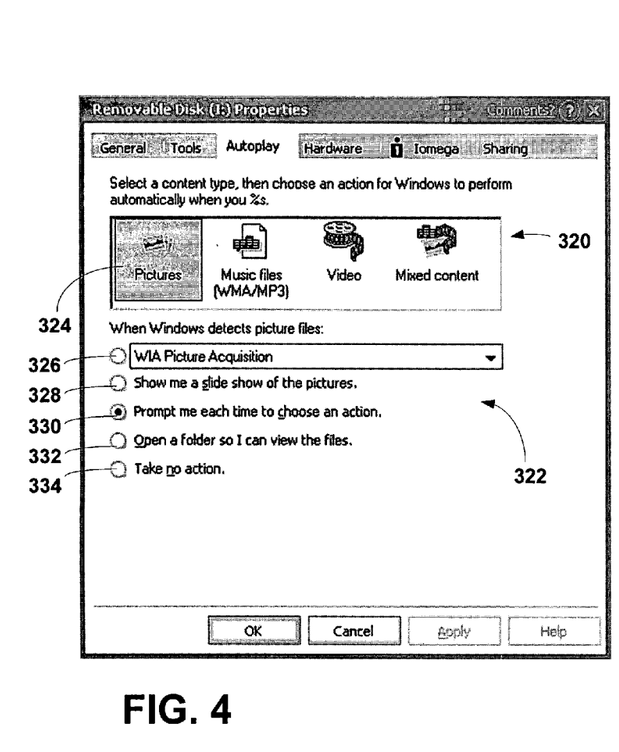
FIG. 4 is a view of a graphical user interface for selecting content and default settings in accordance with a preferred embodiment of the present invention.

If either the ContentTypeHandler or the DeviceHandler has an EventHandler associated with this event, the system determines if a default handler application was previously set up by a user for this ContentType at step 250. FIG. 4 is a view of a graphical user interface for selecting content and default settings in accordance with a preferred embodiment of the present invention. The user may select a particular content type 320 and associate with that content type the proper action to take 322 when that content type is encountered. For example, content containing pictures 324 may have a camera or scanner wizard handler application 326 or a slide show application 328 associated with the picture content type. For music content, the system may associate a "WINDOWS" media player handler application or a CD player handler application for a music CD. When establishing the Autoplay properties for a particular content type, the user may select handler application 326 to run every time a particular content type is encountered. Alternatively, the user may request to be prompted 330 each time a particular content type is encountered. Additionally, when a particular content type is encountered, the user may request that the system open a folder 332 so that the user may view the files. Finally, the user can disable the Autoplay feature by taking no action at all when a particular content type is encountered 334.

If a DefaultHandler has not been established, the system contacts a shell at step 252 to prompt the user to associate the content with a particular handler application. At 254, the system displays the content and a list of handler applications. The user is prompted at step 256 to select a handler application for the ContentType. At 258 the system determines if a handler has been selected, if a handler has not been selected the Autoplay feature is not run.

Figure 6:
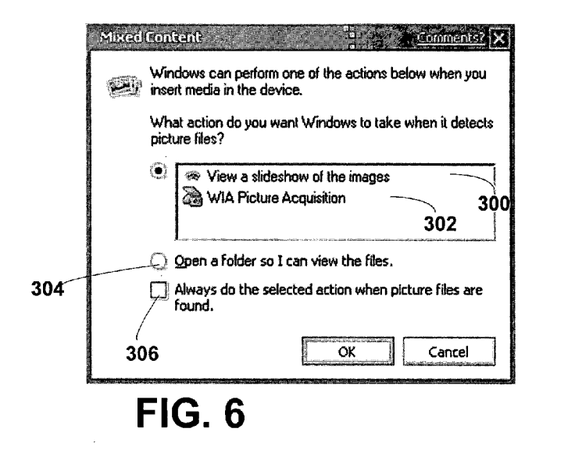
FIG. 6 is a view of a graphical user interface for selecting handler applications for picture content in accordance with a preferred embodiment of the present invention.

FIG. 6 is a view of a graphical user interface for selecting handler applications for picture content in accordance with a preferred embodiment of the present invention. In this example, a picture file is detected. The user may select a handler application 300 or 302 for the picture file detected. Alternatively, the user may choose to open a folder 304 to view the files found on the media or device. Additionally, the user may select box 306 to have the system use the same handler application every time this particular content type is found.

Referring back to FIGS. 2E-2F, if the system recognizes a DefaultHandler application at 250 or upon the user selecting a handler application at 258, the system retrieves the event handler application settings from the registry associated with the handler application at step 260. The application settings are returned in a "ProgID" string value that represents the program ID that will be resolved to a component object model (COM) object class ID (CLSID). At step 262, the system instantiates the CLSID of the handler application in an out-of-process (Out-of-Proc) to handle the device or media event. Then, at step 264, the system will then initialize the application handler COM object instantiated at step 262 using "InitCmdLine" that is a string value that is passed to the instantiated COM object initialize method.

Figure 2F:
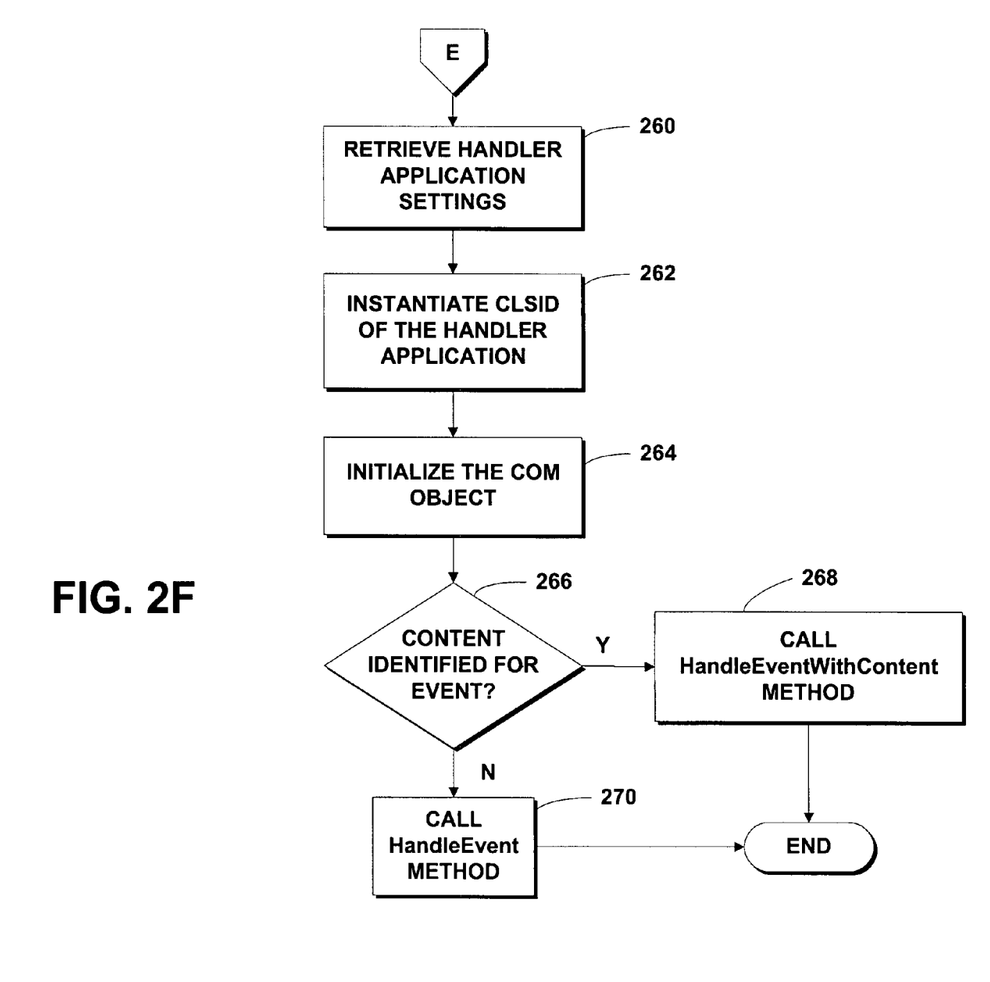

Upon successfully instantiating and initializing the event handler COM object, the Autoplay feature invokes the appropriate HandleEvent method at steps 266-270. At step 266, the system determines if content was identified for this event. If content was identified, the system calls the COM object's HandleEventWithContent method at step 268. If the content was not identified with the event, the system calls the COM object's HandleEvent method as step 270. For example, as described above, MP3 players have proprietary storage and communication methods that do not allow operating systems to access content on the device. Thus, content is not identified when plugging in the MP3 player and the HandleEvent method would be invoked. In both methods, the system will pass along parameters that include the DeviceID, an alternative ID for the device (i.e. a drive letter) and the event type. If the HandleEventWithContent method is called, the system will pass along additional parameters including the ContentTypeHandler ID and the DataObject that is used to retrieve the file names for the content.

Figure 3:
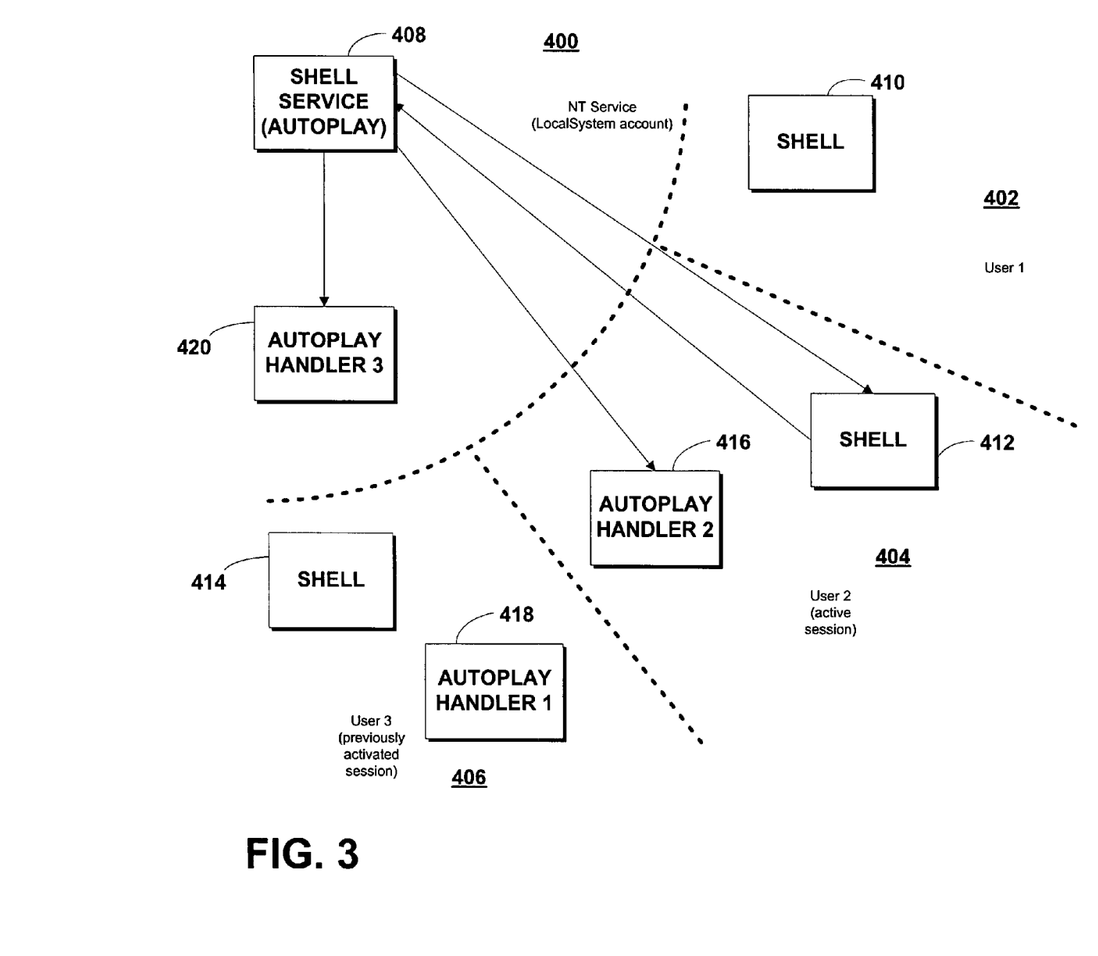
FIG. 3 is a schematic block diagram illustrating a preferred system for implementing the method described in FIGS. 2A-2F.

Referring now to FIG. 3, a block diagram illustrating a preferred system for implementing a method of the present invention is presented. Preferably, the Au HandleEventWithContent method to play feature is implemented in an NT environment with a local system account 400 is in communication with multiple users 402, 404 and 406. A shell service 408 on the local system 400 invokes the Autoplay feature. The shell service 408 prompts the user for information utilizing shells 410, 412 and 414. As illustrated, User 2 (at reference number 404) is the active session where the shell service 408 is actively reporting content and handler application information and prompting User 2 for a response. Shell 412 returns the Autoplay responses from User 2 and then launches the requested handler application to run the content using Handler 416. As illustrated, multiple users may invoke the Autoplay feature using a single Autoplay shell service 408 and have Autoplay handlers running simultaneously. For example, User 3 (at reference number 406) invoked the Autoplay feature prior to User 2 and has an Autoplay handler 418 running at the same time as handler 416. Additionally, Autoplay handler applications may be run locally at the same computer as where the shell service resides as seen with Autoplay handler 420.

In operation, an embodiment of the Autoplay feature is now described by way of example. The following example assumes a Zip drive (device) is connected to the computer system and a disk (media) containing music mp3 files (content) is inserted into the drive.

When the disk is inserted into the drive, the Autoplay feature recognizes this as an event and begins the process by first finding the DeviceHandler for the Zip drive. Assuming that the Zip drive provided a DeviceHandler under the DeviceID level, the system determines if the DeviceHandler has content sniffing information or if the mp3 application to create the Zip disk has defined a DESKTOP.INI file on the disk. Both will allow the Autoplay feature to determine the content information on the Zip disk.

If mp3 files (content) are found on the disk, the system will determine if this is the only content type stored on the disk. Assuming that the disk contains only mp3 music content, the system will determine if the ContentTypeHandler has an EventHandler for this event. If the media failed to register a ContentTypeHandler, the system will search for the EventHandler under the DeviceHandler key. EventHandlers establish the action to take once an event is detected. In this example, an EventHandler would be "PlayMusicOnArrival". Once the EventHandler is found, the system determines if a default handler application was set up to run mp3 content. If not, a dialog box appears and the system prompts the user to select a handler application to play the mp3 files. Upon selection of a handler application, the handler application is launched and the mp3 music begins playing.

The present invention provides users a meaningful method and system for accessing multiple types of content without having to know the particular application to run the content. In one embodiment, the system automatically recognizes content types on the device or media and launches the appropriate application without having the user searching for or knowing the correct application to run the content. In another embodiment, the system prompts the user with an abbreviated list of pertinent handler applications when a particular content type is encountered.

The present invention also uses existing operating system resources to implement the Autoplay feature. The Autoplay feature registers hardware devices and media and software applications using the existing operating system registry. This allows the system to receive updated hardware and software information for existing devices and information for new devices and media developed subsequent to the implementation of the invention.

Alternative embodiments of the present invention become apparent to those skilled in the art to which it pertains upon review of the specification, including the drawing figures. The various computer systems and components shown in FIGS. 1-6 and described in the specification are merely exemplary of those suitable for use in connection with the present invention. Accordingly, the scope of the present invention is defined by the appended claims rather than the foregoing description.

We claim:

1. A method in a computer system for detecting electronic devices having audio and/or visual content and launching computer programs to present the audio and/or visual content, comprising:
   detecting attachment of an electronic device to said computer system, wherein said electronic device includes an internal memory for storing said audio and/or visual content;
   obtaining data describing said electronic device from an operating system, wherein said data includes information related to installation of said electronic device;
   detecting said audio and/or visual content on the internal memory, wherein said detecting includes identifying a plurality of audio and/or visual content types residing on the electronic device and obtaining the content types including enumerating the content types from the electronic device;
   for each of at least a portion of said plurality of audio and/or visual content types identified, assigning one or more computer programs to launch the audio and/or visual content detected on the internal memory; and
   launching at least a portion of the one or more computer programs to present at least a portion of the audio and/or visual content to the user without user intervention in response to said detecting.

2. The method as recited in claim 1, wherein the operating system includes a registry.

3. The method as recited in claim 1, wherein at least a portion of the content on the electronic device has a digital image format.

4. The method as recited in claim 1, wherein at least a portion of the content on the electronic device has an audio or video format.

5. The method as recited in claim 1, wherein obtaining data includes obtaining a device handler for the electronic device.

6. The method as recited in claim 5, wherein the device handler is defined for a device ID.

7. The method as recited in claim 5, wherein the device handler is defined for a device group.

8. The method as recited in claim 5, wherein the device handler is defined for a device class.

9. The method as recited in claim 1, wherein obtaining the content types includes enumerating the content types from an information file.

10. A computer-readable medium having computer-executable instructions for performing the method recited in claim 1.

11. A computer system having a processor, a memory, and an operating environment, the computer system operable to execute the method recited in claim 1.

12. A method in a computer system for detecting an electronic device having internal memory and launching computer programs to present audio and/or visual content on said electronic device, comprising:
   detecting attachment of said electronic device to said computer system, wherein said electronic device includes an internal memory for storing said audio and/or visual content;
   obtaining data describing said electronic device from an operating system, wherein said data includes information associated with installation of said electronic device;
   detecting said audio and/or visual content on the internal memory, wherein said detecting includes obtaining one or more content types on the electronic device and enumerating the content types from the electronic device;
   utilizing said one or more content types to assign a computer program to launch the audio and/or visual content detected on the internal memory, wherein assigning the computer program is performed by the computer system based on said one or more content types; and
   launching the computer program to present the audio and/or visual content to the user without user intervention in response to said detecting.

13. The method as recited in claim 12, wherein at least a portion of the detected content is at least one of a digital image file, an audio file or a video file.

14. The method as recited in claim 12, wherein the content on the electronic device has one content format.

15. The method as recited in claim 12, wherein the content on the electronic device has one or more content formats.

16. The method as recited in claim 12, wherein obtaining data includes obtaining a device handler for the electronic device.

17. The method and recited in claim 16, wherein the device handler is defined for a device ID.

18. The method as recited in claim 16, wherein the device handler is defined for a device group.

19. The method as recited in claim 16, wherein the device handler is defined for a device class.

20. A computer-readable medium having computer-executable instructions for performing the method recited in claim 12.

21. A computer system having a processor, a memory, and an operating environment, the computer system operable to execute the method recited in claim 12.

22. A method in a computer system for registering electronic devices having content in a system registry, comprising:
- detecting attachment of an electronic device to said computer system, wherein said electronic device includes an internal memory for storing said content;
- obtaining data describing said electronic device from the electronic device, wherein said data includes information related to installation of said electronic device;
- placing the data into the registry; and
- detecting audio and/or visual content on the internal memory, wherein said detecting includes obtaining one or more content types on the electronic device and enumerating the content types from the electronic device;
- in response to said detecting, utilizing said one or more content types to assign a computer program to present the audio and/or visual content to the user without user interaction, wherein at least a portion of the detected audio and/or visual content is at least one of a digital image file, an audio file or a video file, and wherein assigning the computer program is performed by the computer system based on said one or more content types.

23. The method as recited in claim 22, wherein the data describing the electronic device is a device handler.

24. The method as recited in claim 22, wherein placing the data into the registry includes registering the data under a device ID.

25. The method as recited in claim 22, wherein placing the data into the registry includes registering the data under a device group.

26. The method as recited in claim 22, wherein placing the data into the registry includes registering the data under a device class.

27. A computer system for detecting content on an electronic device and launching related computer programs, comprising:
- a shell service for assigning audio and/or visual content residing on an electronic device to one or more computer programs, wherein said shell service detects attachment of said electronic device to said computer system and installs said electronic device to the computer system, wherein said shell service detects audio and/or visual content and one or more content, types on said electronic device and enumerating the content types from the electronic device, wherein said shell service utilizes said one or more content types to assign at least one of said one or more computer programs to launch the audio and/or visual content based on said one or more content types; and
- a handler for playing the audio and/or visual content with the one or more computer programs, wherein said one or more computer programs are launched to play the audio and/or visual content without user interaction in response to said shell service detecting said attachment and said audio and/or visual content.

28. The computer system of claim 27 further comprising a user shell for communicating with shell service.

29. The computer system of claim 28, wherein the shell service utilizes the user shell to assign content to one or more applications.

30. In a computer system having a graphic user interface including a display and a user interface selection device, a method of obtaining content on an electronic device and selecting related computer programs, comprising:
- installing an attached electronic device to said computer system;
- detecting audio and/or visual content on an internal memory within said electronic device, wherein said detecting includes obtaining one or more content types on the electronic device and enumerating the content types from the electronic device;
- utilizing said one or more content types to retrieve a list of two or more computer programs associated with at least a portion of said one or more content types, wherein at least one of said two or more computer programs is required to open said audio and/or visual content;
- displaying to a user the list of the two or more computer programs;
- receiving a selection signal from the user choosing one of the two or more computer programs from the list of the two or more computer programs; and
- launching the selected computer program and presenting the audio and/or visual content detected on the electronic device with the selected computer program without user intervention in response to said receiving.

31. The method as recited in claim 30, wherein detecting the content includes enumerating the content types from the electronic device.

32. In a computer system having a graphic user interface including a display and a user interface selection device a method of obtaining audio and/or visual content on an electronic device and selecting related computer programs, comprising:
- detecting attachment of an electronic device to said computer system, wherein said electronic device includes an internal memory for storing said audio and/or visual content;
- detecting said audio and/or visual content on the electronic device, wherein said detecting includes obtaining one or more content types on the electronic device and enumerating the content types from the electronic device;
- utilizing said one or more content types to retrieve a list of two or more computer programs associated with at least a portion of said two or more computer programs, wherein at least one of said two or more computer programs is required to open said audio and/or visual content;
- displaying to a user the list of the two or more computer programs;
- receiving a selection signal from the user choosing one of the two or more computer programs from the list of the two or more computer programs; and
- launching the selected computer program and presenting the audio and/or visual content detected on the electronic device with the selected computer program without user intervention in response to said receiving.

33. The method as recited in claim 32, wherein detecting the content includes enumerating the content types from an information file.

* * * * *